United States Patent [19]
Hadamard

[11] 3,924,144
[45] Dec. 2, 1975

[54] METHOD FOR TESTING LOGIC CHIPS AND LOGIC CHIPS ADAPTED THEREFOR

[75] Inventor: Gilbert Hadamard, Saint Jeannet, France

[73] Assignee: International Business Machines Corporation, Armonk, N.Y.

[22] Filed: Apr. 3, 1974

[21] Appl. No.: 457,333

[30] Foreign Application Priority Data
May 11, 1973 France .................... 73.17606

[52] U.S. Cl. .............. 307/303; 324/73 R; 307/203; 307/221 R
[51] Int. Cl.² .......................... G01R 15/12
[58] Field of Search ....... 324/73 R, 158 R; 307/303, 307/203, 221 R

[56] References Cited
UNITED STATES PATENTS

| | | | |
|---|---|---|---|
| 3,466,544 | 9/1969 | Balderston | 324/158 R |
| 3,758,761 | 9/1973 | Henrion | 324/73 R |
| 3,789,205 | 1/1974 | James | 324/73 R |

*Primary Examiner*—Edward S. Bauer
*Assistant Examiner*—Rolf Hille
*Attorney, Agent, or Firm*—Wesley DeBruin

[57] ABSTRACT

Monolithic structures having high circuit density wherein the circuitry is arranged, and/or includes circuitry, to facilitate testing of said monolithic structure. Method for effectively and efficiently testing the circuits arranged and adapted for testing on a monolithic structure having high density.

Namely, a test method for testing logic chips and logic chips adapted to be tested by said test method.

A test method is disclosed wherein the logic chip, or monolithic structure, is arranged, or divided, into functional sub-assemblies, or logic locks, exhibiting a high degree of testability and includes integrated decoding means allowing individual sub-assemblies to be selected. The decoding means further allow a test pattern applied thereto to be transferred to the selected sub-assembly. Transfer means are provided between the sub-assemblies so as to isolate them electrically from one another during the test operations. The output pattern provided by a sub-assembly in response to the input test pattern applied thereto is applied to gating means which allow all output patterns to be fed to a single output pin.

The above abstract is not to be taken either as a complete exposition or as a limitation of the present invention, the full nature and extent of the invention being discernible only by reference to and from the entire disclosure.

8 Claims, 2 Drawing Figures

METHOD FOR TESTING LOGIC CHIPS AND LOGIC CHIPS ADAPTED THEREFOR

This invention relates to a method used for testing logic chips and to logic chips having circuitry adapted to be tested by said method. More particularly, to a method wherein the logic chips are provided with means allowing the individual and selective testing of all the functional sub-assemblies which comprise the chips.

Tests are necessary to assure that the logic chips conform to a predetermined quality, or performance level. This quality level is chosen to ensure a high degree of reliability of the various components of a machine, such as a data processor, and consequently, of the machine itself.

Tests of large-scale integrated circuit chips, or monolithic structures, are difficult to perform due to the fact that the various circuits integrated in the chips can only be accessed through a limited number of points, namely, the pins of the chips. Frequently, a large-scale integrated circuit chip is provided with fifty pins, this number being limited by mechanical tolerance and stress problems associated with the physical dimensions of the chip or monolithic structure. However, recent technological advances allow the number of circuits integrated in a chip to be increased, which results in such an increase in the number of functional inputs and outputs necessary to the operation of these circuits that it is frequently impossible to allocate several pins for test purposes. The increase in the number of integrated circuits further results in a multiplication of the points to be tested; for example, it is by no means unusual for the number of points to be tested on a single chip to exceed 2,000.

Since it is physically impossible to gain direct access to some two thousand points, currently employed test techniques consist in applying test patterns to the functional inputs of the logic chip to stimulate all possible functions of the various circuits integrated therein. The correct operation of these circuits is checked by means of a comparison between the signals obtained at the functional output pins in response to the input test patterns, and predetermined reference signals. These test techniques, which rely upon a check of the overall operation of the logic chip, are not entirely satisfactory because a considerable number of test patterns is required to fully test each of the circuits or functional sub-assemblies, and also because they do not allow all points to be tested. It has been found that, in most applications, at least 90% of the possible defects should be tested to assure that a logic chip will operate satisfactorily. As many as five thousand test patterns may have to be generated to achieve a testability rate of 85%, and several thousand additional test patterns would be required to achieve a testability rate of 90%. In practice, one man must work for about 5 weeks to produce the test patterns required to achieve 90% testability in the case of the more complex logic chips. The above-mentioned figure of five thousand test patterns applies to chips 160 mils × 160 mils in size; consequently, when the larger chips (250 mils × 250 mils) which are now being developed and will allow the number of logic cells or blocks to be increased by 2,000 become available, the problem of testing these chips will be critical. Since the larger chips will have nearly five times as many logic cells as today's conventional chips, the time required to test the proposed chips will be substantially increased, without, however, being five times longer than at present.

United States Patent Application, Ser. No. 238,268 filed Mar. 27, 1972, by R. L. James, entitled "Serial Test Pattern for MOSFET Testing" and of common assignee herewith, granted as U.S. Pat. No. 3,790,885 on Feb. 5, 1974, discloses a technique for reducing the number of test patterns required to test a large-scale integrated circuit chip and for testing those functional sub-assemblies which cannot be tested by using conventional methods. Said technique consists in applying a serial test pattern to a single input pin and in storing same in a shift register which is integrated in the chip and comprises a number of stages equivalent to the number of circuits or points to be tested. Each of these stages is connected bi-directionally to a respective one of said circuits. The content of each stage of the register is used to check the operation of the circuit to which it is connected or to test a point which could not normally be tested, and the feedback signals provided by the circuit are stored in said stage. The shift register is also used to provide in serial form to a single output pin an indication of the operation of the circuits tested, by serially shifting the contents of the shift register out onto the single output pin.

A drawback of the above technique is that it requires the use of a shift register having a number of stages corresponding to the number of functional sub-assemblies to be tested. For example, in the case of a chip two thousand points of which must be tested, the shift register would have to comprise two thousand stages, which is hardly feasible considering the space such a register would occupy on the surface of a chip. For this reason, provision is made in the above-identified U.S. Pat. No. 3,790,885, for the utilization of conventional test techniques involving the application of test patterns to the functional inputs of the chip, in addition to the use of such a shift register, thereby allowing the size of the shift register to be reduced. Thus, the test technique disclosed in U.S. Pat. No. 3,790,885 could not be used alone where a large number of points must be tested on a chip, and would have to be complemented by conventional test techniques.

Accordingly, it is an object of the present invention to provide a test method which allows all of the points of a logic chip to be tested, regardless of the number of such points, and does not require the use of any other complementary test technique.

Another object of the present invention is to provide a test method which provides a logic chip testability rate of over 90%.

Another object of the invention is to provide a test method which allows all functional sub-assemblies of a logic chip to be tested individually and selectively.

The above and further objects are attained in accordance with the invention by providing a test method wherein the logic chip is divided into functional sub-assemblies or logic chips exhibiting a high degree of testability and includes integrated decoding means allowing individual sub-assemblies to be selected. The decoding means further allows a test pattern applied thereto to be transferred to the selected sub-assembly. Transfer means are provided between the sub-assemblies so as to isolate them electrically from one another during the test operations. The output pattern provided by a sub-assembly in response to the input test pattern applied thereto is applied to gating means which allow all output patterns to be fed to a single output pin.

The foregoing and other objects, features and advantages of the invention will be apparent from the following more particular description of a preferred embodiment of the invention, as illustrated in the accompanying drawings.

Figure 1:
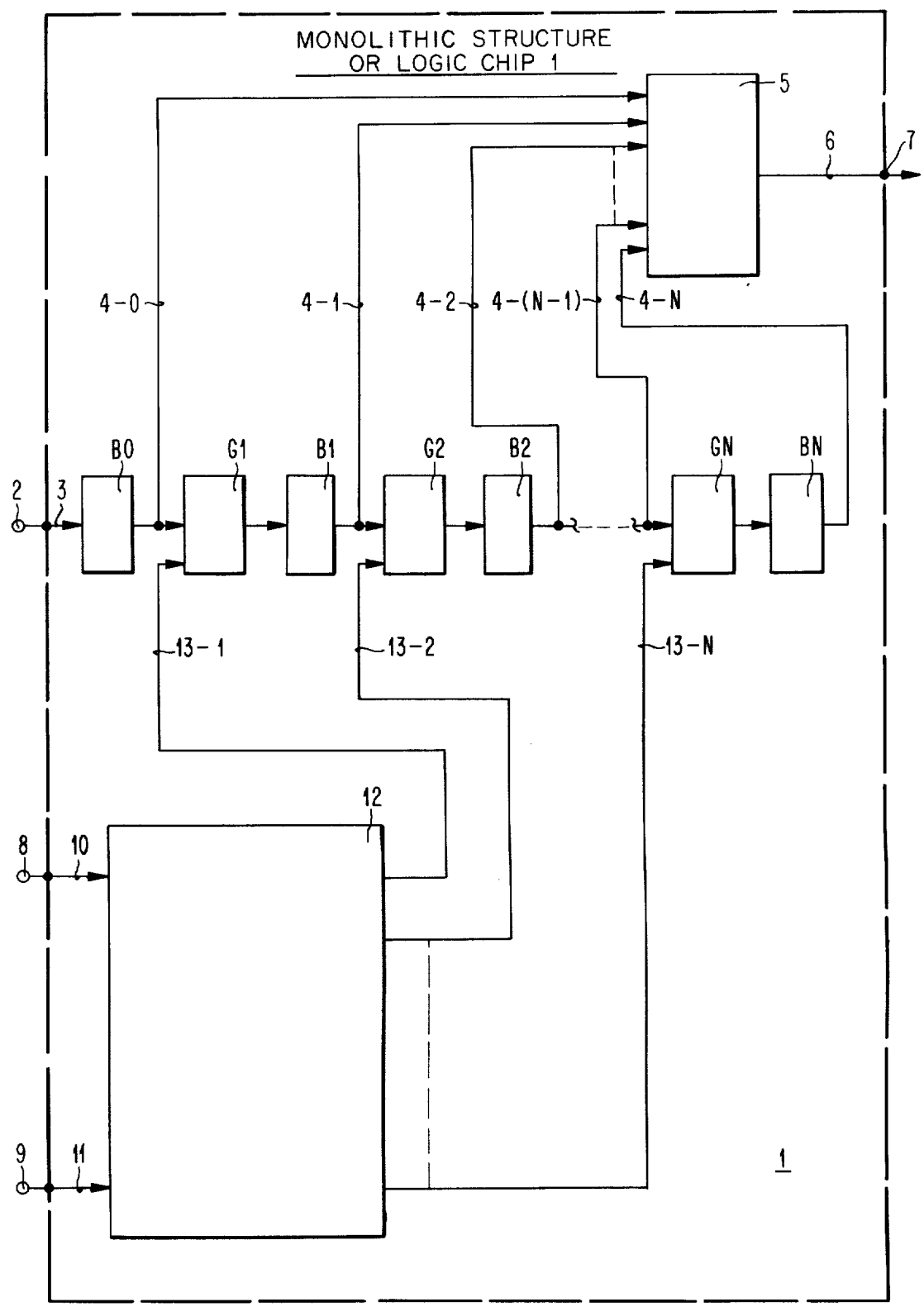
FIG. 1 is a schematic diagram illustrating a logic chip in accordance with the present invention.

Referring now to FIG. 1, a logic chip in accordance with the invention is illustrated. A logic chip generally comprises a number of functional sub-assemblies or logic blocks interconnected in such a way as to enable the desired logic functions to be performed. The logic chip illustrated in FIG. 1 includes a chain of functional logic blocks B0, B1, ..., BN of the type usually found in chips the function of which is to provide the control signals necessary to the operation of an electronic device. For clarity, a single chain of functional logic blocks has been shown in FIG. 1. However, a complete chip may include any number of such chains or other arrangements of functional logic blocks. Usually, the logic blocks are comprised of triggers, shift registers or other binary logic circuits. According to the present invention, logic blocks the testability of which exceeds 90% should preferably be used to assure that the testability of the chip will exceed 90%.

Logic blocks B0, B1, ..., BN are interconnected via gates G1, G2, ..., GN. The functional input pin 2 of the chain is connected via functional input line 3 to the input of block B0 the output of which is connected to a first input of gate G1. The output of gate G1 is connected to the input of block B1, the output of which is connected to a first input of gate G2, and so on. The output of block B (N-1) (not shown) is connected to a first input of gate GN the output of which is connected to the input of block BN. The outputs of blocks B0, B1, B2, ..., BN are connected via lines 4-0, 4-1, 4-2, ..., 4-N, respectively, to the inputs of a gate 5. It should be noted that line 4-N represents the functional output of the chain. The output of gate 5 is connected via output line 6 to a single output pin 7. A pair of test pins 8 and 9 respectively used to select given logic blocks and to apply test patterns thereto are connected via lines 10 and 11, respectively, to the inputs of decoding means 12 the outputs of which are respectively applied to the second input of each of the successive gates G1, G2, ..., GN via selection lines 13-1, 13-2, ..., 13-N.

The method used in accordance with the invention to test the various blocks of the logic chip 1 of FIG. 1 will now be described in general terms. A more detailed description will later be given with reference to FIG. 2.

The various blocks B0, B1, ..., BN are tested individually and selectively. Before the test, the outputs of all logic blocks are reset by resetting means (not shown). The test of the first block in the chain, B0, will differ slightly from that of the other logic blocks since its input can be accessed directly from the functional input pin 2. The test of block B0 is performed by first applying the address of this block to decoding means 12 via pin 8 and line 10. Decoding means 12 control the selection lines 13-1, 13-2, ..., 13-N to cause the gates G1, G2, ..., GN to which they are connected to be held in a non-conducting state. The specific test pattern intended for block B0 is then applied thereto via functional input pin 2 and line 3. In response to this test pattern, block B0 provides an output pattern which is applied to output pin 7 via line 4-0, gate 5 and line 6, but not to the input of block B1 since gate G1 is in a non-conducting state. The output pattern available at output pin 7 is then compared with a reference output pattern to determine whether block B0 is operating properly.

Anyone of the remaining blocks B1, ..., BN can be tested as follows: The address of the block, for example B1, is applied to decoding means 12 via pin 8 and line 10. This address is decoded by decoding means 12 which select selection line 13-1 connected to gate G1. The effect of the selection of line 13-1 is to inhibit the transmission of the output signals from block B0 to the input of block B1, and to allow the specific test pattern associated with block B1 to be applied thereto via pin 9, line 11, decoding means 12, line 13-1 and gate G1. Simultaneously with the selection of line 13-1, decoding means 12 condition all other selection lines, 13-2, ..., 13-N so as to cause the gates to which they are connected to be held in a non-conducting state. In response to the application of the test pattern, block B1 provides an output pattern which is applied to the output pin 7 via line 4-1, gate 5 and line 6. This output pattern is not applied to block B2 since gate G2 is in a non-conducting state. The correct operation of block B1 can then be verified by checking the output pattern available at pin 7.

As previously mentioned, a distinction is made between the test of block B0 and the tests of the other blocks, B1, B2, ..., BN in order to take advantage of the fact that the input of block B0 can be accessed directly from the functional input pin 2. However, if such a distinction is not desired, block B0 can, of course, be tested in the same manner as the other blocks by providing connection means between test pin 8 and the input of block B0.

Figure 2:
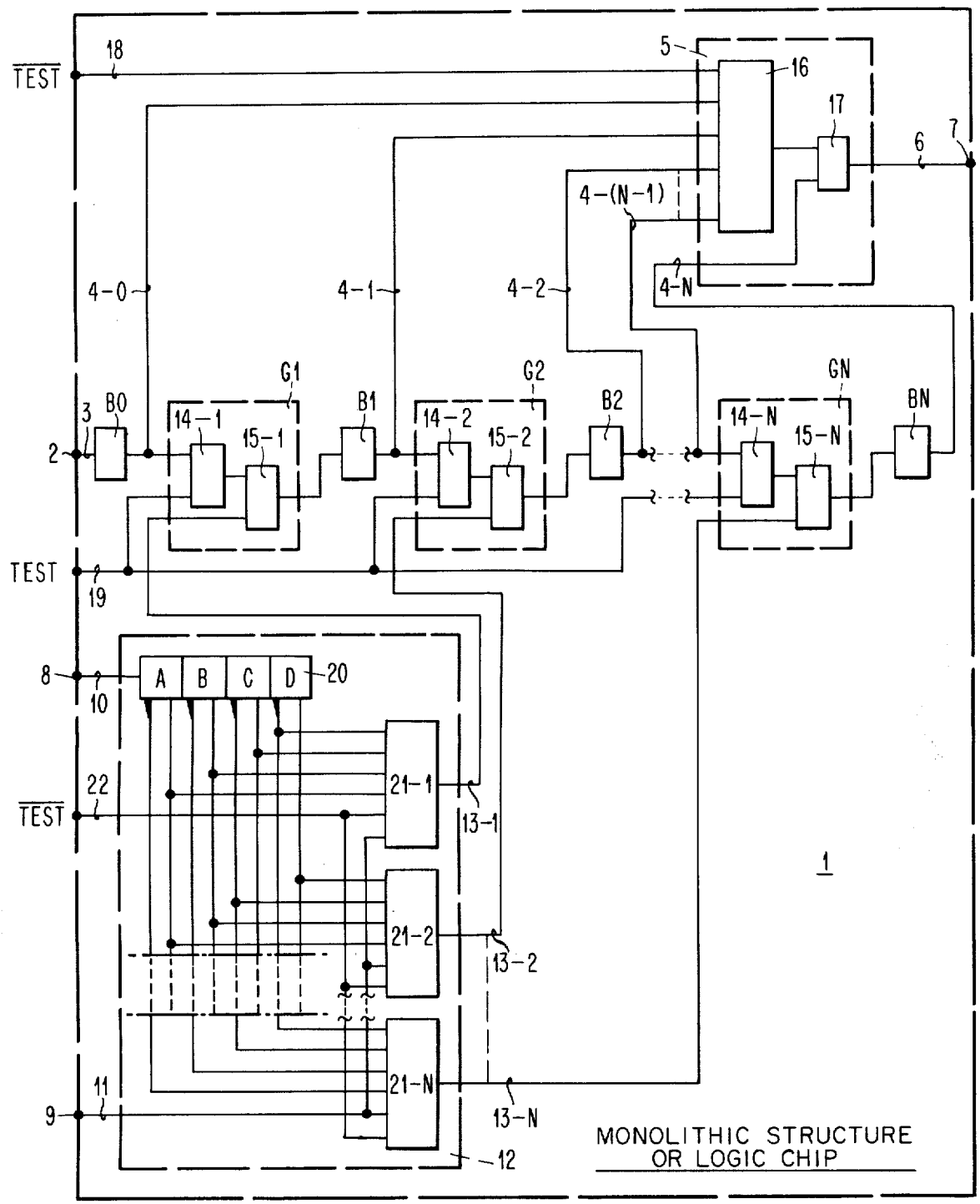
FIG. 2 illustrates in greater detail the logic chip of FIG. 1.

Referring now to FIG. 2, the logic chip of FIG. 1 is shown in greater detail. The elements illustrated in FIG. 2 which are identical with those of FIG. 1 are given the same reference numerals.

As has been mentioned in connection with FIG. 1, the logic blocks B0, B1, B2..., BN, are interconnected via gated G1, G2, ..., GN. Each of these gates includes first and second two-input NOR gates connected in series. Thus, gate G1 includes NOR gates 14-1 and 15-1; gate G2 includes NOR gates 14-1 and 15-2; and gate GN includes NOR gates 14-N and 15-N. The output of block B0 is connected to a first input of NOR gate 14-1. The output of NOR gate 14-1 is connected to a first input of NOR gate 15-1, the output of which is connected to the input of block B1. The output of block B1 is connected to a first input of NOR gate 14-2. The output of NOR gate 14-2 is connected to a first input of NOR gate 15-2, the output of which is connected to the input of block B2, and so on. The output of block B (N-1), not shown, is connected to a first input of NOR gate 14-N. The output of NOR gate 14-N is connected to a first input of NOR gate 15-N, the output of which is connected to the input of block BN.

As has been explained in connection with FIG. 1, the outputs of blocks B0, B1, B2, ..., B (N-1), BN are connected to the inputs of a gate 5 via lines 4-0, 4-1, ..., 4-N. In the example illustrated in FIG. 2, gate 5 includes two NOR gates 16 and 17 connected in series. The outputs of blocks B0, B1, ..., B (N-1) are connected to the inputs of NOR gate 16 via lines 4-0, 4-1, ..., 4-(N-1). The output of NOR gate 16 is connected to a first input of NOR gate 17, the second input of which is connected to the output of block BN via line 4-N. The output of NOR gate 17 is connected to the output line 6. A control line labeled $\overline{\text{TEST}}$ 18 is connected to one of the inputs of NOR gate 16.

The second input of each of NOR gates 14-1, 14-2, ..., 14-N is connected in another control line labeled TEST 19.

A possible implementation of the decoding means 12 of FIG. 1 is shown by way of example in FIG. 2. Block selection line 10 is connected to the input of a shift register 20. In this example, shift register 20 comprises four stages for storing four bits, A, B, C and D. Each stage has a "true" output and a "complement" output, the latter being identified in the figure by means of a black triangle. Decoding means 12 further include (N-1) NOR gates, where N is the number of functional blocks to be tested. Each of these NOR gates receives as input a specific combination of the four bits A, B, C, D stored in shift register 20. In this example, NOR gate 21-1 receives combination $\text{ABC}\overline{\text{D}}$, NOR gate 21-2 combination $\text{AB}\overline{\text{C}}\text{D}$ and NOR gate 21-N combination $\overline{\text{A}}\,\overline{\text{B}}\,\overline{\text{C}}\,\overline{\text{D}}$. The output of NOR gate 21-1 is connected to the second input of NOR gate 15-1 via selection line 13-1. The output of NOR gate 21-2 is connected to the second input of NOR gate 15-2 via selection line 13-2. The output of NOR gate 21-N is connected to the second input of NOR gate 15-N via selection line 13-N. NOR gates 21-2, 21-2, ..., 21-N also receive as inputs the signals provided via test pattern input line 11 and via a control line labeled $\overline{\text{TEST}}$ 22.

Before describing the operation of the device illustrated in FIG. 2, it may be helpful to remind the reader that the output of a NOR gate is at a 1 or high logical level only when all its inputs are at a 0 or low logical level. Consequently, if all inputs but one are at a 0 level, a sequence of 1 or 0 logical level signals applied to that one input will appear in an inverted form at the output of the NOR gate.

Before testing the logic blocks, the output of each block is reset by resetting means (not shown). The various blocks are then tested individually and selectively. After a given block has been tested, its output is reset by the resetting means. However, the input test pattern may be used, if desired, instead of the resetting means to reset the block after testing.

While testing the logic blocks, control line TEST 19 is at a 1 logical level. This 1 level is applied to the second input of each of NOR gates 14-1, 14-2, ..., 14-N, which causes the output of these gates to be at a low or 0 logical level. As a result, blocks B0, B1, ..., BN are isolated from one another and can be tested individually without the output of the block under test having any effect upon the next successive block.

The test of block B1 will now be described by way of example. The address of this block, which in the example illustrated in FIG. 2 is 0001, is applied to line 10 and stored in shift register 20. In accordance with the connections between the outputs of register 20 and the inputs of NOR gate 21-1, the first input of NOR gate 21-1 (shown as the upper input of this gate in FIG. 2) is at a 0 logical level since it is connected to the "complement" output of stage D storing bit 1 of the address of block B1. Similarly, the second, third and fourth inputs of NOR gate 21-1 are at a 0 logical level since they are connected to the "true" outputs of stages A, B and C storing bits 0 of the address of block B1. In addition, the fifth input of gate 21-1 is at a 0 logical level applied thereto via control line $\overline{\text{TEST}}$ 22. Thus, the first five of this gate's six inputs are at a 0 logical level. The specific test pattern associated with block B1 which is applied to the sixth input of NOR gate 21-1 via line 11 appears in inverted form at the output of this gate since all other inputs thereof are at a 0 logical level, and is applied to selection line 13-1.

It should be noted that this test pattern is applied to line 13-1, only, because all other NOR gates, such as 21-2 and 21-N, located within decoding means 12 are in a non-conducting state. As explained earlier, a different combination of the address bits stored in shift register 20 is applied to the input of each of the other NOR gates in decoding means 12. As far as the address of block B1 is concerned, only one of these combinations, that is, the one applied to NOR gate 21-1, entirely consists of 0's and allows the transmission of the test pattern applied to line 11. The combinations applied to the other NOR gates contain at least one 1 bit, causing the output of these NOR gates to be at 0 logical level and preventing the transmission of the test pattern applied to line 11.

The specific test pattern associated with block B1 and present on selection line 13-1 is applied to the second input of NOR gate 15-1, the first input of which is held at a 0 logical level because of the application of a 1 logical level to control line TEST 19 via NOR gate 14-1. NOR gate 15-1 therefore allows the test pattern present on line 13-1 to be transmitted to the input of block B1. It will be noted that the test pattern associated with block B1 and present on line 11 is inverted a first time by NOR gate 21-1 and a second time by NOR gate 15-1, and, therefore, appears in its original or true form at the input of block B1.

The output pattern provided by block B1 in response to the test pattern applied thereto is applied via line 4-1 to one of the inputs of NOR gate 16. It should be noted that the output pattern is not applied to the input of block B2 since the output of NOR gate 14-2 is held at a 0 logical level by the 1 logical level applied to control line TEST 19. The other inputs of NOR gate 16 are at a 0 logical level due to the fact that the outputs of all logic blocks, except B1, as well as control line $\overline{\text{TEST}}$ 18 are at a 0 logical level. Consequently, the output pattern provided by block B1 is transmitted via NOR gate 16 to the first input of NOR gate 17. Since the second input of NOR gate 17 is at a 0 logical level, this level being applied thereto by logical block BN, the output pattern provided by block B1 is transmitted via NOR gate 17 to the output line 6. It should be noted that this output pattern is inverted a first time by NOR gate 16 and a second time by NOR gate 17 and appears in its original or true form on output line 6. The output pattern present on line 6 is then applied to output pin 7 (see FIG. 1) where it may be used to check the operation of block B1.

The other functional blocks of the logic chip are tested individually and selectively in the same manner as described above with respect to block B1.

Under normal operating conditions, that is, when tests are not being performed, control line $\overline{\text{TEST}}$ 18 is at a 0 logical level so that NOR gates 14-1, 14-2, ..., 14-N are in a conducting state. Control line $\overline{\text{TEST}}$ 22 is at a 1 logical level so that the output of each of NOR gates 21-1, 21-2, ..., 21-N is at a 0 logical level. These 0 levels are applied via selection lines 13-1, 13-2, ..., 13-N to NOR gates 15-1, 15-2, ..., 15-N and hold these gates in a conducting state. Thus, gates G1, G2, ..., GN are enabled and will not affect the normal operation of blocks B0, B1, B2, ..., BN. Control line $\overline{\text{TEST}}$ 18 is at a 1 logical level, so that the output of NOR gate 16 is at a 0 logical level. This 0 level is applied to the first input of NOR gate 17 which is thus enabled to transmit to line 6 the functional output signals provided by block BN via functional output line 4-N. Thus, the arrangement illustrated in FIG. 2, permits the use of a single output pin serving both as a test output and as a functional output.

It should be noted that, while specific decoding means 12 have been described in relation to the example illustrated in FIG. 2, any other equivalent means could be used. It should further be noted that while the decoding means illustrated in FIG. 2 are used both to select the block to be tested and to transmit test signals to that block, the latter function could be performed, if desired, by suitable connection means. Also, while the gates G1, G2, ..., GN and 5 described above consist of NOR gates, the latter could obviously be replaced with any other suitable logic circuits.

While the invention has been particularly shown and described with reference to a preferred embodiment thereof, it will be understood by those skilled in the art that various changes in form and detail may be made therein without departing from the spirit and scope of the invention.

What is claimed is:

1. A logic chip having high circuit density and wherein said circuitry is arranged and adapted to facilitate testing, said logic chip including:
    several functional logic blocks exhibiting a high degree of testability;
    a logic block selection input pin;
    decoding means responsive to the application thereto via said logic block selection input pin of the address of a given logic block to select said logic block;
    a test pattern input pin;
    connection means for applying an input test pattern entered via said test pattern input pin to said selected logic block;
    a single output pin; and
    gating means for transmitting to said single output pin the output pattern provided by said selected logic block in response to the input test pattern applied thereto.

2. A logic chip as recited in claim 1, wherein first gating means is provided for electrically isolating said logic blocks from one another and for applying said input test pattern to the selected logic block.

3. A logic chip as recited in claim 2, wherein second gating means is provided for connecting the outputs of said logic blocks to said single output pin.

4. A logic chip having circuitry arranged and adapted to be tested, said logic chip comprising:
    several functional logic blocks, each exhibiting a high degree of testability;
    a first set of gates for interconnecting said logic blocks;
    a shift register for storing the address of the logic block to be tested;
    a second set of gates the inputs of which are connected to the output of each stage of said shift register so that each of said second set of gates may receive as input a different combination of the bits of said address for decoding said address;
    means for connecting the output of each gate of said second set of gates to one of the gates of said first set of gates, respectively;
    a single test pattern input pin connected to the input of each of the gates of said second set of gates, the decoding of said address allowing a test pattern applied to said single test pattern input pin to be transmitted to the output of a selected gate of said second set of gates; and
    test control means connected to the gates of said first set of gates for electrically isolating said logic blocks from one another and for applying said test pattern to the input of the logic block to be tested via said selected gate of said second set of gates and via the gate of said first set of gates which is connected to said selected gate.

5. A logic chip as recited in claim 4, said logic chip including an output gate the inputs of which are connected to the outputs of said logic blocks and the output of which is connected to said single output pin of said logic chip.

6. A monolithic structure having high circuit density, and wherein the circuitry contained on and within said monolithic structure is arranged and adapted to be efficiently tested, said circuitry also being arranged and adapted to provide an output in response to an input and wherein said output is a logical function of said input, said monolithic structure comprising; one through $n$ logical circuits each having at least one input and at least one output; one through $n - 1$ gating means; connection means connecting said one through $n$ logical circuits and said one through $n - 1$ gating means in series, whereby except for the input of a first one of said $n$ logical circuits and the output of said $n$th logical circuit, the output of each of said $n$ logical circuits is coupled via one of said $n - 1$ gating means to the input of a discrete other one of said n-logical circuits; a monolithic structure input connected to said input of said first one of said $n$ logical circuits; monolithic structure output; output gating means having $n + 1$ inputs and an output connected to said monolithic structure output; test control means; said $n + 1$ inputs of said output gating means being respectively connected to each of said $n - 1$ gating means, said output of said $n$th logical circuit, and said test control means; said test control means having at least one accessible control terminal; said test control means intercoupling said $n - 1$ gating means and said output gating means, said test control means being adapted to electrically isolate any selected one of said $n$ logical circuits from all remaining ones of said $n$ logical circuits, said test control means including receiving means for receiving and applying a test pattern of test data to the input of said selected one of said $n$ logical circuits, whereby under control of said test control means, each of said $n$ logical circuits is electrically isolated from said remaining ones of said logical circuits and logically tested by the application of a test pattern of test data to the input thereof.

7. An integrated circuit logic chip having logical circuitry, gating circuitry, and test circuitry arranged and interconnected thereon to facilitate the testability of said logic chip, said integrated circuit logic chip comprising:
    a plurality of logic blocks, each of said logic blocks including at least one logical circuit, each of said logic blocks having an input and an output; a logic chip input coupled to at least one of said logic block inputs;

a logic chip output;

gating means interconnecting said plurality of logic blocks, said gating means also interconnecting the output of at least one of said plurality of logic blocks to said logic chip output;

test circuit means connected to, and cooperating with said gating means for electrically isolating any selected one of said plurality of logic blocks from all other ones of said plurality of logic blocks, said test circuit means including data receiving means adapted to receive a data input and impress said data input on the input of said electrically isolated selected one of said plurality of logic blocks, whereby each of said plurality of logic blocks of said logic chip may be electrically isolated and tested.

8. An integrated circuit logic chip having logical circuitry, gating circuitry, and test circuitry arranged and interconnected thereon to facilitate the testability of said logical circuitry, said integrated logic chip comprising:

a first test control input terminal, a second test control input terminal, a third test control input terminal, a logic circuit address input terminal, a test pattern input terminal, at least one data input terminal, and at least one data output terminal;

one through $n$ logical circuits each having at least one input and at least one output where $n$ is an integer;

one through $n-1$ gating means, each of said $n-1$ gating means having a first input, a second input, a third input and an output, each of said $n-1$ gating means including first and second NOR circuits, each of said NOR circuits having a first input, a second input and an output, each of said $n-1$ gating means including first connection means for connecting said first input of said gating means to said first input of said first NOR circuit, said second input of said gating means to said second input of said first NOR circuit, said first input of said second NOR circuit to said output of said first NOR circuit, said second input of said second NOR circuit to said third input of said gating means, and said output of said second NOR circuit to said output of said gating means;

second connection means for connecting said one through $n$ logical circuits and said one through $n-1$ gating means in series, whereby except for the input of the first one of said $n$ logical circuits and the output of said $n$th logical circuit, the output of each said n logical circuits is connected to the first input of a discrete one of said $n-1$ gating means and the output of each of said $n-1$ gating means is connected to the input of a discrete other one of said $n$ logical circuits;

a third NOR circuit having $n$ discrete inputs and an output;

a fourth NOR circuit having a first input, a second input and an output;

a shift register having one through $k$ stages, said shift register having an input to the first of said $k$ stages and $2k$ outputs, and where said $2k$ outputs of said shift register consists of a true output and a complement output from each of said $k$ stages of said shift register, and where $k$ is an integer less than the integer $n$;

$n-1$ NOR circuits each having $k+2$ inputs and an output;

third connection means for connecting said first test control input terminal to a discrete one of said $n$ inputs of said third NOR circuit;

fourth connection means for connecting each of the outputs of the first through $n-1$ logical circuits of said one through $n$ logical circuits, to a discrete one of said remaining $n-1$ inputs of said third NOR circuit;

fifth connection means for connecting said input of said logic circuit of said one through $n$ logic circuits to said data input terminal;

sixth connection means for connecting the output of said third NOR circuit to the first input of said fourth NOR circuit;

seventh connection means for connecting the output of said nth logical circuit to the second input of said fourth NOR circuit;

eighth connection means for connecting the output of said fourth NOR circuit to said data output terminal;

ninth connection means for connecting in common the second input of each of said $n-1$ gating means to said second test control input terminal;

tenth connection means for connecting each of said outputs of said N − 1 NOR circuits to a discrete one of said third inputs of said N − 1 gating means;

eleventh connection means for connecting $k$ of the $k+2$ inputs of each of the N − 1 NOR circuits to $k$ of the $2k$ outputs of said shift register, whereby $k$ of the $k+2$ inputs of each of the N − 1 NOR circuits is connected to a distinct group of $k$ outputs of the $2k$ outputs of said shift register;

twelfth connection means for connecting in common one of the two remaining inputs of the $k+2$ inputs of each of the N − 1 NOR circuits to said third test control input terminal;

thirteenth connection means for connecting in common the remaining input of the $k+2$ inputs of each of the N − 1 NOR circuits to said test pattern input terminal;

fourteenth connection means for connecting said input of said first stage of said shift register to said logic circuit address input terminal.

* * * * *